US008173255B2

(12) United States Patent
Basfar et al.

(10) Patent No.: US 8,173,255 B2
(45) Date of Patent: May 8, 2012

(54) CLEAN FLAME RETARDANT INSULATION COMPOSITION TO ENHANCE MECHANICAL PROPERTIES AND FLAME RETARDANCY FOR WIRE AND CABLE

(75) Inventors: Ahmed Ali Basfar, Riyadh (SA); Hun Jai Bae, Ontario (CA)

(73) Assignee: King Abdulaziz City Science and Technology, Riyadh (SA)

( * ) Notice: Subject to any disclaimer, the term of this patent is extended or adjusted under 35 U.S.C. 154(b) by 44 days.

(21) Appl. No.: 12/683,444

(22) Filed: Jan. 7, 2010

(65) Prior Publication Data

US 2011/0166279 A1 Jul. 7, 2011

(51) Int. Cl.
*B32B 27/32* (2006.01)

(52) U.S. Cl. ......... 428/379; 428/378; 428/689; 428/921

(58) Field of Classification Search .................. 428/457, 428/379, 378, 689, 921

See application file for complete search history.

(56) References Cited

U.S. PATENT DOCUMENTS

| | | | | |
|---|---|---|---|---|
| 5,378,539 | A * | 1/1995 | Chen | 428/378 |
| 5,889,087 | A * | 3/1999 | Hayashi et al. | 523/173 |
| 6,436,557 | B1 * | 8/2002 | Moriuchi et al. | 428/689 |
| 6,506,841 | B2 | 1/2003 | Fomperie et al. | |
| 7,144,941 | B2 | 12/2006 | Sauerwein et al. | |
| 7,357,907 | B2 | 4/2008 | Resasco et al. | |
| 7,361,430 | B1 | 4/2008 | Gennett et al. | |
| 7,378,040 | B2 | 5/2008 | Luo et al. | |
| 7,413,474 | B2 | 8/2008 | Liu et al. | |
| 7,462,318 | B2 | 12/2008 | Schroeder et al. | |
| 7,491,883 | B2 | 2/2009 | Lee et al. | |
| 2006/0057742 | A1 | 3/2006 | Mano et al. | |
| 2007/0259462 | A1 | 11/2007 | Liang | |

FOREIGN PATENT DOCUMENTS

| | | | |
|---|---|---|---|
| EP | 01777258 | B1 | 10/2008 |
| EP | 01918249 | B1 | 5/2009 |

* cited by examiner

*Primary Examiner* — Ling Choi
(74) *Attorney, Agent, or Firm* — Raj Abhyanker, P.C.

(57) ABSTRACT

One of the major problems of commercial clean flame retardant materials is unstable mechanical properties because of high filler loadings. Clean flame retardant compositions having very low smoke and toxicity generation are invented by a method based on partial cross-linking of polymers. These composites are processed by routine thermoplastic extruder and do not use post curing system. Composition mainly contain 100 parts by weight (p/w) of resin (polyolefin or 100 p/w of polyolefin/ethylene propylene diene monomer rubber (EPDM rubber)), 90-150 p/w of non halogen content main flame retardants, 0.1-0.5 parts by weight of crosslinking agent, 1-20 p/w of auxiliary secondary flame retardant agents and 0.2-1.0 p/w of antioxidants. Clean flame retardant compositions use peroxide composite as a crosslinking agent and metal hydroxide composite as a flame retardant. The present invention demonstrates more reliable method for producing clean flame retardant insulations for wire and cable without deterioration of mechanical properties.

20 Claims, No Drawings

CLEAN FLAME RETARDANT INSULATION COMPOSITION TO ENHANCE MECHANICAL PROPERTIES AND FLAME RETARDANCY FOR WIRE AND CABLE

FIELD OF INVENTION

This disclosure generally relates to a non toxic, halogen free, clean flame retardant insulation composition for enhancing mechanical properties and flame retardancy in wire and cable. More particularly, this invention relates to a clean flame retardant insulation composition which is extruded by using regular thermoplastic procedure without post curing.

BACKGROUND

Every year, the world faces huge losses in lives and property due to residential and commercial fires caused by, electrical wiring. Human lives can be lost due to high temperature flames, toxic smoke and gas that are generated from the flammable insulation materials used in wires and cables during fire.

The current population uses various gadget and equipments that contain several wires and cables. Most wires and cables are fabricated from plastic materials that are readily flammable. However, modern living involves heavy use of electric equipment containing wires and communication systems made of cables. In addition, nowadays many people live and work in densely populated buildings and structures in limited spaces. These conditions further increase the mortality rate and property damage due to electrical fire stemming from bad wire or cable insulation. At the least smoke and toxic fumes emanating from poorly insulated materials in wires and cables can cause irreparable health damage and even loss of life.

Wire and cable insulations must meet both electrical properties and mechanical properties requirements. Polyethylene and polyvinylchloride compounds are some of the best materials for wire and cable insulations because of their excellent electrical and mechanical properties. However, these materials have major weaknesses due to their lack of flame retardancy and high generation of toxic gases.

Polyethylene, for example, is easily flammable but generates less toxic gases during burning. Conversely, Polyvinylchloride compound generates a high level of toxic gases even though it has acceptable flame retardancy. Current investigations are being carried out to find flame retardant materials for wires and cables that do not generate toxic gases, such as halogen free flame retardant compounds (HFFR compounds), clean flame retardant materials or non toxic flame retardant materials. Currently, clean flame retardant materials are made from special formulations based on halogen and toxicity free chemicals that restrict the generation of toxic smoke. Clean flame retardant materials mainly consist of matrix polymers that do not contain halogen, main flame retardants, secondary flame retardants, intumescent flame retardants, processing aids and antioxidants. (Mans V et al. 1998, Rai M et al. 1998, Wei P et al. 2006 and Luciana R et al. 2005). This resultant mixture has very poor mechanical properties.

Another significant problem with commercial clean materials is their unstable mechanical properties in spite of possessing high flame retardancy due to high filler loadings. Clean flame retardant materials contain relatively high content of flame retardants which are mainly consisted of inorganic materials. In general, high loadings of flame retardants are needed to achieve commercially acceptable flame retardancy for wire and cable applications. However, high levels of flame retardants lead to significant deterioration in mechanical properties. The insulation and jacket materials for wire and cable should meet appropriate tensile strength, elongation at break, thermal resistance and flame retardancy for proper use. Modified thermoplastic compound for wire and cable insulations must meet IEC 60502 and BS 6724 and 7655 standard requirements.

EVA(ethylene vinyl acetate), EVA/LDPE (low density polyethylene)(or LLDPE (linear LDPE), ethylene alpha olefin or ethylene ethyl acrylate are widely used as matrix polymer for their high flame retardant quality, load ability which can increase the flame retardancy. These polymers may be used in higher concentrations to improve flame retardancy. Inorganic materials, such as, aluminum trihydroixide (ATH), magnesium hydroxide (MH) and huntite hydromagnesite (HH) are used as flame retardants because of their high decomposition temperature and smoke suppression capabilities as clean flame retardant materials. However, more than 50% w/w of inorganic materials is sufficient for flame retardancy. High concentration of these flame retardants may lead to interfacial problems between matrix polymer and flame retardants, which could result in poor mechanical properties of the insulation of wires and cables.

Various studies have been performed to improve mechanical properties and flame retardancy using encapsulated organic flame retardants (Chang et al. 2006, Du L et al. 2006, Liu Y et al. 2006), combination of hydrotalcite with two other flame retardants and organo-modified montmorillonite (Laoutid F et al. 2006, Ma H et al. 2006).

Encapsulated organic flame retardants enhance the interfacial adhesion with matrix polymers and lead to improved dispersion in comparison to untreated flame retardants. Hydrotalcite composites increase flame retardancy by releasing more gas compared to general flame retardants during fire. In addition, partial substitution of general flame retardants by organo-modified montmorillonite improves fire properties. Nevertheless, most of studies focus to improve flame retardancy. However, cost of production and performance of the final products needs to be considered.

However, most of wire and cable production specifications for clean flame retardant materials require not only excellent mechanical properties but also high flame retardant properties. The minimum requirement for tensile strength is 8.8 MPa and minimum elongation at break is 125% based on IEC 60502 and BS 6724, 7655 standards for thermoplastic compounds. Without meeting these two important properties, the clean flame retardant materials are not suitable for wire and cable insulation materials. There is a need to obtain a cable or wire insulation material that contains a clean flame retardant material and has superior mechanical properties and flame retardancy.

SUMMARY

This invention relates to composition and method of making thermoplastic (not thermosetting) clean flame retardant materials for wire and cable. This invention pertains to unique formulations and processing methods of clean flame retardant materials of wire and cable. Partially crosslinked clean flame retardant compositions, using routine thermoplastic extruder/without using post curing systems is invented. The invented clean flame retardant compositions are particularly suitable for use in enhanced cable insulations meeting most of thermoplastic compounds standard requirements.

The polymer in clean flame retardant compositions are under 50% by weight and flame retardants parts are over 50% by weight. Moreover, the particle sizes of most flame retardants used in the composition is under 50 μm. Excellent dispersion of polymer/flame retardants in compound can be achieved and almost same distance between polymer and flame retardants may be realized. Even segmental cross-linking reactions occur in the compounds, total torque is not increased because the ratio of the polymer influences by cross-linking reactions.

The extruding temperature of clean flame retardant materials because they are composed of low temperature softening polymer grade compared to routine thermoplastics such as polyethylene. The lower extruding temperature also suppresses torque increase due to segmental cross-linking of clean flame retardant materials.

DETAILED DESCRIPTION

There are two types of clean flame retardant materials for wire and cable, i.e., thermoplastic (without crosslinking) and thermosetting (crosslinked). This invention relates to thermoplastic type clean flame retardant materials for wire and cable. More particularly, this invention relates to partially crosslinkable clean flame retardant compositions for increasing mechanical properties without flame retardancy deterioration and can be partially crosslinked by routine thermoplastic extruder/without using post curing system. Partially crosslinkable clean flame retardant compositions are particularly suitable for use in enhanced cable insulations meeting IEC 60502 and BS 6724, 7655 standards for thermoplastic compound requirements.

This invention pertains to a unique formulation and processing method of clean flame retardant insulation materials for wire and cable. The present invention results in improved mechanical properties, particularly tensile strength and elongation at break without reducing flame retardancy. More particularly, this invention relates to formulations and processing methods of clean flame retardant materials for improving mechanical properties by partial or segmental crosslinking during extrusion.

Partial crosslinking (segmental crosslinking) method is introduced in this invention to increase mechanical properties while maintaining high flame retardancy. Partial crosslinking means that polymers are partially crosslinked and not fully crosslinked. Partial crosslinking is considered as active high temperature crosslinking during extruding process using routine cable extruder without using special crosslinking zone (high temperature curing pipe). During the partially crosslinking process the compound may be made of a melt portion and a non melt portion. The polymer if present as 100% in the compound (no inorganic filler content compound), during partial crosslinking the torque for the compound is increased because of the absence of buffers. On the contrary, in the case of high filled compound, when partial crosslinking occurred, the torque of compound can be absorbed by fillers because the compound is made of high filler content and low polymer content.

In general, three different types of cross-linking methods are used in wire and cable industry, namely, radiation crosslinking, high temperature/pressure continuous crosslinking by peroxide and normal extruding/silane graft crosslinking. Among these different methods, radiation and continuous crosslinking methods need huge investment leading to an increase in products costs. Thermosetting type of clean flame retardant materials insulated wire and cable can be produced by radiation or continuous crosslinking methods. On the other hand, silane graft crosslinking is also very popular in wire and cable industry because investment cost in production facility is low. However, it is quite difficult to maintain the quality control in high filled compounds such as clean flame retardant materials. The products by these crosslinking methods are called thermosetting insulation. The production method for clean flame retardant materials by this invention is different from above cross-linking methods and does not belong to thermosetting insulation category.

The following conventional formulations as examples show actual problems of clean flame retardant compositions in terms of mechanical properties and flame retardancy.

As examples, three different types of flame retardants are investigated, such as MAGNIFIN A Grades H10A (magnesium hydroxide, formula: $Mg(OH)_2$ producer: Albemarle/France) (See Conventional EXAMPLE 1), Ultracarb LH 15× (huntite hydromagnesite, formula: $Mg_3$ $Ca(CO_3)_4$, $Mg_5(CO_3)_4(OH)_2.3H_2O$, producer: Minelco/USA) (See Conventional EXAMPLE 2) and KISUMA 5B (magnesium hydroxide, formula: $Mg(OH)_2$, Producer: Kyowa Chemical/Japan) (See Conventional EXAMPLE 3). Evaflex 360 (ethylene vinyl acetate, producer: DuPont-Mitsui Polychemicals Co./Japan, vinyl acetate content: 25%, melt mass-flow rate (MFR) (190° C./2.16 kg): 2.0 g/10 min) and LLDPE 118 (liner low density polyethylene, melt flow index: 1.0 g/10 min, producer: SABIC/Saudi Arabia) are used as base polymer and Irganox 1010 (chemical name: pentaerythritol tetrakis(3(3,5-di tert-buty-4-hydroxyphenyl)propionate, producer: CIBA specialty chemicals/Switzerland, melting range: 110-125° C.) is used as antioxidant. Perkadox BC-FF (pure di cumyl peroxide (DCP), producer: AKZO NOBEL/Netherlands, formula: $C_6H_5$—$C(CH_3)_2$—O-β-$C(CH_3)_2$—$C_6H_5$, melting point: 39.5° C.) is used as cross-linking agent.

All materials used for the examples and conventional examples are summarized in Table 1.

TABLE 1

Material list

| Function/Chemical Name | Material | Producer | Characteristics |
|---|---|---|---|
| Polymer, ethylene vinyl acetate (EVA) | Evaflex 360 | DuPont-Mitsui Polychemicals Co./Japan | vinyl acetate content: 25%, melt mass-flow rate (MFR) (190° C./2.16 kg): 2.0 g/10 min) |
| Polymer, linear low density polyethylene (LLDPE) | LLDPE 118 | SABIC/Saudi Arabia | melt flow index: 1.0 g/10 min |
| Polymer, ethylene propylene diene monomers (EPDM) | Vistalon 7001 | ExxonMobil/USA | ethylidene norbornene (diene) weight: 5 wt % |

TABLE 1-continued

| Material list | | | |
|---|---|---|---|
| Function/Chemical Name | Material | Producer | Characteristics |
| Polymer, hydrocarbon rubber | NORDEL IP 3722P | DOW Chemicals/USA | ethylidene norbornene (diene) weight: 0.5 wt % |
| Flame retardant, magnesium hydroxide, formula: $Mg(OH)_2$ | MAGNIFIN A Grades H10A | Albemarle/France | |
| Flame retardant, huntite hydromagnesite, formula: $Mg_3Ca(CO_3)_4$, $Mg_5(CO_3)_4(OH)_2 3H_2O$ | Ultracarb LH 15X | Minelco/USA | |
| Flame retardant, magnesium hydroxide, formula: $Mg(OH)_2$ | KISUMA 5B | Kyowa Chemical/Japan | |
| Antioxidant, pentaerythritol tetrakis(3(3,5-di tert-buty-4-hydroxyphenyl)propionate, | Irganox 1010 | CIBA specialty chemicals/Switzerland | melting range: 110-125° C. |
| Carbon black | Corax N550 | Degussa/Germany | semi-active carbon black with high structure, ash content: 0.5% |
| Intuescent flame retardants, red phosphorus masterbatch | Exolit RP 692 | Clariant/France | phosphorus content: approx. 50% (w/w) |
| Intuescent flame retardants, zinc borate | Firebrake ZB | Borax/USA | |
| Intuescent flame retardants, Boric Acid | Boric Acid | Rose Mill Chemicals & Lubricant/USA | |
| Intuescent flame retardants, ammonium octamolybdate (AOM) | CLIMAX | Climax Molybdenum Company/USA | formula: $(NH—_4)_4Mo_8O_{26}$ |
| Cross-linking agent, di cumyl peroxide (DCP) | Perkadox BC-FF | AKZO NOBEL/Netherlands | formula: $C_6H_5—C(CH_3)_2—O—O—C(CH_3)_2—C_6H_5$, melting point: 39.5° C. |

The reason for using LDPE (or LLDPE) in base polymers is to increase thermal properties of thermoplastic clean flame retardant compositions. In general, high filler mixable polymers, such as ethylene vinyl acetate(EVA), ethylene ethyl acrylate(EEA) or ethylene alpha olefin have very low softening temperatures. Mostly, their softening points are under 100° C. Therefore, it is apparent that using only low softening temperature grade polymers without any high temperature grade polymers in base polymers will lead to loss in thermal properties. The thermal aging test condition of thermoplastic clean flame retardant material is 100° C. for 136 hours. To achieve appropriate thermal stability, the mixing of high temperature grade polymer such as polyethylene is required. Therefore, the base polymers in thermoplastic clean flame retardant compositions should have appropriate thermal stability to pass the thermal aging test (at 100° C. for 136 hours). However, polyethylene has low filler mix ability and lower flame retardancy, accordingly, ethylene vinyl acetate/polyethylene compounded base polymers can mix less volume of flame retardants and decrease flame retardancy compared to 100% ethylene vinyl acetate base polymer.

Normal thermosetting type clean flame retardant compositions are presented in conventional EXAMPLE 4 to demonstrate the differences between our invention and normal thermosetting type. The main difference is the content of crosslinking agent. Namely, normal thermosetting clean flame retardant compositions contain 2-4 parts by weight of crosslinking agent while the compositions of this invention contain 0.1-0.4 parts by weight of crosslinking agent. Moreover, processing methods of both compositions are quite different from each other.

Mechanical properties (tensile strength and elongation at break) were measured using a universal testing machine Model 5543 from Instron, USA in accordance with ASTM D 638M with testing conditions: speed of 500 mm/minute at 25° C. LOI (Limiting Oxygen Index) is a simple method to evaluate the flame retardancy of the materials. LOI was performed using an apparatus of Fire Testing Technology limited (Incorporating Stanton Redcroft), UK in accordance with ISO 4589 and ASTM D 2863. LOI corresponds to the minimum percentage of oxygen needed for the combustion of specimens (80×10×1 mm) in an oxygen-nitrogen atmosphere. The other method to estimate the flame retardancy of the materials is UL 94 Flammability standard by Underwriters Laboratories, USA. UL 94 test was performed using a flammability chamber of CEAST Co., Italy, in accordance with ASTM D 635 for horizontal and ASTM D 3801 for vertical test positions. The standard classifies plastics according to how they burn in various orientations and thicknesses. From lowest (least flame-retardant) to highest (most flame-retardant), the classifications are:

TABLE 2

| Standard Classification of material based on their orientation and thickness | | |
|---|---|---|
| Standard Classification | Description | Conditions allowed |
| HB | Slow burning on a horizontal specimen; burning rate <76 mm/min for thickness <3 mm | |
| V2 | Burning stops within 30 seconds on a vertical specimen | Drips of flaming particles are allowed |
| V1 | Burning stops within 30 seconds on a vertical specimen | No drips allowed |

TABLE 2-continued

| Standard Classification of material based on their orientation and thickness | | |
|---|---|---|
| Standard Classification | Description | Conditions allowed |
| V0 | Burning stops within 10 seconds on a vertical specimen | No drips allowed |

CONVENTIONAL EXAMPLE 1

| Content/Property | C-1 | C-2 | C-3 | C-4 |
|---|---|---|---|---|
| Ethylene vinyl acetate (Evaflex 360) | 80 | 80 | 80 | 80 |
| Linear low density polyethylene (LLDPE 118W) | 20 | 20 | 20 | 20 |
| Magnesium hydroxide (MAGNIFIN A Grades H10A) | 90 | 120 | 150 | 180 |
| Pentaerythritol tetrakis(3(3,5-di tert-buty-4-hydroxyphenyl)propionate (Irganox1010) | 1.0 | 1.0 | 1.0 | 1.0 |
| Tensile strength (MPa) | 9 | 12 | 13 | 14 |
| Elongation at break (%) | 200 | 160 | 120 | 90 |
| LOI (%) | 24 | 31 | 36 | 40 |
| UL 94 test | H-B | H-B | H-B | H-B |

These formulations are very basic for thermoplastic clean flame retardant compositions which are only consisted of one main flame retardant (magnesium hydroxide (MAGNIFIN A Grades H10A)). From the experimental results, it is found that elongation at break decreases greatly even though tensile strength and flame retardancy increase with increase of content of magnesium hydroxide (MAGNIFIN A Grades H10A). However, the highest magnesium hydroxide (MAGNIFIN A Grades H10A) content (180 phr (per hundred resin)) by weight formulation (C-4) does not meet V-0 of UL 94 test in spite of great loss in elongation at break.

CONVENTIONAL EXAMPLE 2

| Content/Property | C-5 | C-6 | C-7 | C-8 |
|---|---|---|---|---|
| Ethylene vinyl acetate (Evaflex 360) | 80 | 80 | 80 | 80 |
| Linear low density polyethylene (LLDPE 118W) | 20 | 20 | 20 | 20 |
| Huntite hydromagnesite (Ultracarb LH 15X) | 90 | 120 | 150 | 180 |
| Pentaerythritol tetrakis(3(3,5-di tert-buty-4-hydroxyphenyl)propionate (Irganox1010) | 1.0 | 1.0 | 1.0 | 1.0 |
| Tensile Strength (MPa) | 6 | 7 | 8 | 9 |
| Elongation at break (%) | 200 | 160 | 120 | 90 |
| LOI (%) | 23 | 27 | 34 | 37 |
| UL 94 test | H-B | H-B | H-B | H-B |

Similar to Example 1, these formulations are also very basic for thermoplastic clean flame retardant compositions although the main flame retardant is changed from magnesium hydroxide to huntite hydromagnesite (Ultracarb LH 15×). From the experimental results, similar trend is observed, i.e. elongation at break decreases greatly even though tensile strength and flame retardancy increase with increase of content of huntite hydromagnesite. However, the highest huntite hydromagnesite (Ultracarb LH 15×) content (180 phr (per hundred resin)) by weight formulation (C-8) does not meet V-0 of UL 94 test in spite of great loss in elongation at break.

CONVENTIONAL EXAMPLE 3

| Content/Property | C-9 | C-10 | C-11 | C-12 |
|---|---|---|---|---|
| Ethylene vinyl acetate (Evaflex 360) | 80 | 80 | 80 | 80 |
| Linear low density polyethylene (LLDPE 118W) | 20 | 20 | 20 | 20 |
| Magnesium hydroxide (KISUMA 5B) | 90 | 120 | 150 | 180 |
| Pentaerythritol tetrakis(3(3,5-di tert-buty-4-hydroxyphenyl)propionate (Irganox1010) | 1.0 | 1.0 | 1.0 | 1.0 |
| Tensile strength (MPa) | 13 | 10 | 9 | 7 |
| Elongation at break (%) | 550 | 550 | 500 | 500 |
| LOI (%) | 22 | 27 | 35 | 39 |
| UL 94 test | H-B | H-B | H-B | H-B |

Similar to Examples 1 and 2, these formulations are also very basic for thermoplastic clean flame retardant compositions and the main flame retardant is consisted of a different product of magnesium hydroxide (KISUMA 5B). From the experimental results of magnesium hydroxide (KISUMA 5B) formulations, a different tendency is observed, i.e. tensile strength decreases greatly even though elongation at break is very high. In addition, flame retardancy increases with increase of magnesium hydroxide (KISUMA 5B) content. However, the highest magnesium hydroxide (KISUMA 5B) content (180 phr (per hundred resin)) by weight formulation (C-12) does not meet V-0 of UL 94 test in spite of great loss in tensile strength.

CONVENTIONAL EXAMPLE 4

| Content/Property | C-13 | C-14 | C-15 | C-16 |
|---|---|---|---|---|
| Ethylene vinyl acetate (Evaflex 360) | 90 | 90 | 90 | 90 |
| Linear low density polyethylene (LLDPE 118W) | 10 | 10 | 10 | 10 |
| Magnesium hydroxide (MAGNIFIN A Grades H10A) | 90 | 120 | 150 | 180 |
| Pentaerythritol tetrakis(3(3,5-di tert-buty-4-hydroxyphenyl)propionate (Irganox1010) | 1.0 | 1.0 | 1.0 | 1.0 |
| Di cumyl peroxide (Perkadox BC-FF) | 3 | 3 | 3 | 3 |
| Tensile strength (MPa) | 11 | 13 | 15 | 16 |
| Elongation at break (%) | 170 | 150 | 120 | 110 |

-continued

| Content/Property | C-13 | C-14 | C-15 | C-16 |
|---|---|---|---|---|
| LOI (%) | 25 | 32 | 35 | 40 |
| UL 94 test | H-B | H-B | H-B | H-B |

These formulations are very basic for thermosetting clean flame retardant compositions which are only consisted of one main flame retardant (magnesium hydroxide (MAGNIFIN A Grades H10A)). The cross-linking was performed by di cumyl peroxide. It is found that slightly higher mechanical properties are obtained by cross-linking compared with thermoplastic formulations and elongation at break decreases greatly even though tensile strength and flame retardancy increase with increase of content of magnesium hydroxide (MAGNIFIN A Grades H10A). However, the highest magnesium hydroxide (MAGNIFIN A Grades H10A) content (180 phr (per hundred resin)) by weight formulation (C-16) does not meet V-0 of UL 94 test in spite of great loss in elongation at break.

As shown in conventional examples, it is found that no composition pass V-0 of UL 94 test with satisfactory mechanical properties of minimum tensile strength 8.8 MPa and minimum elongation at break 125% based on IEC 60502. To pass V-0 of UL 94 test, generally intumescent flame retardants such as red phosphorus, zinc borate, and (or) boric acid are additionally compounded. However, additional intumescent flame retardants can cause to decrease mechanical properties in spite of increasing flame retardancy.

Our unique method involves partial cross-linking only by cross-linking agent such as peroxide in high filled compound. This is quite different from high temperature/pressure continuous cross-linking by peroxide even though cross-linking mechanism of both methods is similar. In the case of high temperature/pressure continuous crosslinking by peroxide, 1) 2-3 parts crosslinking agent by weight per hundred parts of resin should be compounded, 2) extruding temperature of compounds should be kept at 120-140° C. to avoid cross-linking reactions during extrusion and 3) the cross-linking reactions occur mainly in long and high pressure/high temperature curing pipe. On the other hand, the partial crosslinking method by this invention does not need expensive continuous curing pipe, one can use routine wire and cable extruder and the extruding temperature is the same as in the case of general ethylene vinyl acetate (EVA)/high filled compounds.

As known, in the case of pure polymers such as polyethylene, ethylene vinyl acetate (EVA) and several types of rubber compounds, it is almost impossible to conduct partial crosslinking during routine extrusion.

As explained above, in the case of high temperature/pressure continuous cross-linking, cross-linkable compounds consist of 100 parts polymer (in general, polyethylene in cable insulation) by weight, 2-3 parts peroxide by weight and 0.1-0.3 parts antioxidant by weight. Only, in the case of color or weathering protection, a small content of color master batch or carbon black is compounded in this composition. Moreover, even we attempt to partially crosslink polyethylene during routine cable extrusion by reducing peroxide content in this formulation, it is very difficult to maintain quality control due to occurring of scorch. Here, scorch is defined as premature cross-linked of polymers such as ethylene vinyl acetate (EVA)/LLDPE. Accumulated scorch disturbs the polymer flow between screw and barrel, and then, finally, the screw rotation stops due to high disturbing pressure. Therefore, the change from thermoplastic to thermosetting of cable insulations by peroxide is conducted by post high temperature/pressure continuous cross-linking pipe not by extruding process in the present wire and cable industry.

In the current invention, clean flame retardant materials consist of 100 parts polymer (EVA (Ethylene Vinyl Acetate), EVA/polyethylene, EEA (Ethylene Ethyl Acrylate)/polyethylene or Ethylene Alpha Olefin/polyethylene) by weight and 100-150 parts inorganic flame retardants such as magnesium hydroxide, aluminum hydroxide and huntite hydromagnesite by weight, 2-20 parts intumescent flame retardants such as red phosphorus, zinc borate, and boric acid by weight, 0.5-1.5 parts antioxidant by weight. For special purposes, additional coloring agent, weathering protection agent, processing aid, coupling agent, lubricant and thermal stabilizer are compounded.

Therefore, polymer portion in total compound is very low, namely, polymer portion (by weight) is under 50% of total compound in many cases. Moreover, the particle size of most flame retardants used in clean flame retardant materials are under 50 μm and so excellent dispersion of polymer/flame retardants in compound can be easily achieved by melt type mixing machine, such as internal melt type mixer. When polymer/flame retardants are well mixed in compounding process, it is assumed that the arrangement of polymer and flame retardants is very well balanced. In the current invention, almost the same distance between polymer and flame retardants can be achieved. Due to this, the total torque of highly filled compound is not suddenly increased while the segmental cross-linking reaction is occurring for the final compound. It is definite that only polymer portions are influenced by cross-linking reactions, however flame retardants are not influenced by any chemical reactions, therefore partial cross-linking reactions in polymers does not affect the final compound.

Important point for processing of clean flame retardant materials for routine thermoplastics is that the extruding temperature of clean flame retardant materials is 140-180° C. while that of routine thermoplastics is 200-250° C. The extruding temperature of clean flame retardant materials is lower than routine thermoplastics such as polyethylene because clean flame retardant materials consist mainly of low softening temperature grade polymers such as EVA (Ethylene Vinyl Acetate), Ethylene Alpha Olefin or Ethylene Ethyl Acrylate.

The measuring torque of final compound is increased by segmental cross-linking reactions during extrusion for highly filled compounds. Crucial point for clean flame retardant materials during processing is that the torque is slightly increased initially and then stabilized over the range of segmental cross-linking reactions. Moreover, it is found that the increase in torque is mainly dependent on the content of crosslinking agent (usually peroxide is used) and the types of flame retardants. In this invention, 0.1-0.2 parts peroxide per hundred resin by weight shows the best result in ethylene vinyl acetate (EVA)/magnesium hydroxide (MAGNIFIN A Grades H10A) (120 phr) formulations. Contents more than 0.4 parts peroxide per hundred resin by weight formulations lead to presence of scorch reactions in extrusion due to increased torque and increased crosslinking degree. In the case of ethylene vinyl acetate (EVA)/magnesium hydroxide (KISUMA 5B) (120 phr) formulations, 0.2-0.4 parts peroxide per hundred resin by weight showed the best result. The details of formulations and their properties are shown in various EXAMPLES.

Therefore, the selection of crosslinking agent and the content of crosslinking agent are very important in this invention.

Besides, the surface treatment polymers can be used to achieve better performance during extrusion.

One more important point in partial crosslinking reaction of clean flame retardant materials (highly filled compounds) should have good process ability. Because the compounds are partially crosslinked, the overall torque of compounds during extrusion is increased. The overall torque in processing of clean flame retardant materials (highly filled compounds) is higher than that of uncross-linked highly filled compounds, unfilled compounds or slightly filled compounds. Besides, flow rate of high filled compound at un-cross-linked state is higher than that of slightly filled or non filled compounds. Therefore, sudden increase in torque during extrusion can easily happen in the case of partially cross-linked highly filled compounds. To avoid sudden increase in torque during extrusion and to produce smooth surface of wire and cable with partially cross-linked highly filled compounds, a unique idea was invented. In the current invention attempts to mix special materials which have excellent miscibility with ethylene vinyl acetate (EVA)/polyethylene, that can reduce the torque during extrusion, have better skin effect for the surface of wire and cable and that can be slightly crosslinked by peroxide, were done. These required materials help overcome the processing problems of partially cross-linked highly filled compounds.

Very low molecular weight polyethylene, very low molecular weight ethylene vinyl acetate (EVA), low molecular weight ethylene alpha olefin, low molecular weight ethylene ethyl acrylate and ethylene propylene diene monomer (EPDM) are suggested as suitable materials for these purposes. Multiple parameters were investigated for the above materials for miscibility with ethylene vinyl acetate (EVA)/polyethylene. All materials showed good miscibility with ethylene vinyl acetate (EVA)/polyethylene, however, low molecular weight polyethylene, ethylene vinyl acetate (EVA), ethylene alpha olefin and ethylene ethyl acrylate showed decreased mechanical properties at a content range of 5-20% by weight in total base polymers. Ethylene propylene diene monomer (EPDM), on the other hand, showed good results in terms of mechanical properties. It was also considered that low ethylidene norbornene (ENB) and high ethylene content ethylene propylene diene monomer (EPDM) can give higher filler loading capability, this means that these grades ethylene propylene diene monomer (EPDM) have better mixing capability with EVA/polyethylene/flame retardants. Selection of suitable ethylene propylene diene monomer (EPDM) grades is very important on the aspects of compatibility with ethylene vinyl acetate (EVA)/polyethylene/flame retardants and surface treatments after extrusion for clean flame retardant materials.

The following non-limiting examples illustrate several formulations of the invented composition.

EXAMPLE 1

| Content/Property | | 1 | 2 | 3 | 4 |
|---|---|---|---|---|---|
| Ethylene vinyl acetate (Evaflex 360) | | 75 | 75 | 75 | 75 |
| Linear low density polyethylene (LLDPE 118W) | | 20 | 20 | 20 | 20 |
| Ethylene propylene diene monomer (Vistalon 7001) | | 5 | 5 | 5 | 5 |
| Magnesium hydroxide (MAGNIFIN A Grades H10A) | | 120 | 120 | 120 | 120 |
| Pentaerythritol tetrakis(3(3,5-di tert-buty-4-hydroxyphenyl)propionate (Irganox1010) | | 1 | 1 | 1 | 1 |
| Di cumyl peroxide (Perkadox BC-FF) | | 0 | 0.2 | 0.4 | 0.6 |
| Room temperature | Tensile strength (MPa) | 11 | 13 | 14 | 15 |
| | Elongation at break (%) | 100 | 220 | 215 | 210 |
| Thermal aging at 100° C. for 168 hrs | Retention of tensile strength (%) | Over 80% | | | |
| | Retention of elongation at break (%) | Over 80% | | | |
| LOI (%) | | 34 | 34 | 34 | 33 |
| UL 94 test | | H-B | H-B | H-B | H-B |

The compounding of the above compositions is preferably processed as followings, namely, ethylene vinyl acetate (EVA) and linear low density polyethylene (LLDPE) are melted and mixed in internal mixer for four minutes at 150° C. Then, rest of additives and flame retardants without crosslinking agent were mixed with already melted polymers for 10 minutes at 150° C. The pre-mixed compounds are moved to two roll mill/guider cutter/pelletizing extruder and then pelletized. At this step, temperature of two roll mixer was kept around 150° C. and mixture is processed for 5-10 minutes. Final pellets are obtained from blending of above pellets and DCP at a temperature of 40° C. After addition of DCP, the mixture is moved to cool storage and used for cable extruding. Vistalon 7001(Ethylene Propylene Diene Monomers (EPDM), producer: ExxonMobil, ENB ethylidene norbornene (diene) weight: 5 wt %) is used as the surface treatment polymer for achieving better extruding performance. Sheets of test specimen for mechanical properties and flame retardancy are prepared by hot press and compressed at 180° C. for 10 minutes with thickness of 2 mm. Likewise, the above materials are preferably extruded at temperature 160° C.-170° C. onto conductors to prepare the insulated cable and check process ability. This extruding process is exactly the same as routine thermoplastic method without post cross-linking process.

During cable extrusion of above compositions, non cross-linking agent composition (run number 1) and 0.2 parts peroxide per hundred resin by weight (run number 2) show the best process ability and excellent surface on finished cables. On the contrary, more than 0.4 parts peroxide per hundred resin by weight compositions (run number 3 and 4) lead to scorch reactions in extrusion and the surface of extruded cables were not smooth. It was found that partially crosslinked composition (run number 2) shows much improved mechanical properties compared to normal thermoplastic composition (run number 1) without any processing problems. Specially, elongation at break increases from 100% to 220% by partial crosslinkinkg.

In addition, the above partially cross-linked compositions show excellent thermal properties by passing thermal aging test (100° C.×136 hrs). It is advised that 20 parts by weight of polyethylene in base polymer improve thermal aging properties and additionally, partial crosslinking may enhance thermal properties further.

EXAMPLE 2

| Content/Property | | 5 | 6 | 7 | 8 |
|---|---|---|---|---|---|
| Ethylene vinyl acetate (Evaflex 360) | | 75 | 75 | 75 | 75 |
| Linear low density polyethylene (LLDPE 118W) | | 20 | 20 | 20 | 20 |
| Ethylene propylene diene monomer (Vistalon 7001) | | 5 | 5 | 5 | 5 |
| Magnesium hydroxide (MAGNIFIN A Grades H10A) | | 120 | 120 | 120 | 120 |
| Carbon black (Corax N550) | | 5 | 5 | 5 | 5 |
| Pentaerythritol tetrakis(3(3,5-di tert-buty-4-hydroxyphenyl)propionate (Irganox1010) | | 1 | 1 | 1 | 1 |
| Di cumyl peroxide (Perkadox BC-FF) | | 0 | 0.2 | 0.4 | 0.6 |
| Room temperature | Tensile strength (MPa) | 11 | 14 | 15 | 16 |
| | Elongation at break (%) | 105 | 230 | 225 | 210 |
| Thermal aging at 100° C. for 168 hrs | Retention of tensile strength (%) | Over 80% | | | |
| | Retention of elongation at break (%) | Over 80% | | | |
| LOI (%) | | 35 | 35 | 35 | 33 |
| UL 94 test | | V-2 | V-2 | V-2 | H-B |

5 parts by weight of Corax N550 (carbon black, producer: Degussa, Germany) mixed compositions are compounded and cable extruded similar to previous methods. The main roles of carbon black in polymer composites are well known as UV absorber and flame retardant. One reason for using carbon black is for protecting the inside cable from severe weathering conditions.

Same as previous example (Example 1), non cross-linking agent composition (run number 5) and 0.2 parts peroxide per hundred resin by weight (run number 6) show the best process ability, mechanical properties and excellent surface smoothness for finished cables after extrusion. On the contrary, more than 0.4 parts peroxide per hundred resin by weight compositions (run number 7 and 8) lead to scorch reactions in extrusion and the surface of extruded cables was not smooth. Of course, partially cross-linked and carbon black mixed compositions show excellent thermal properties and the flame retardancy increased by addition of carbon black.

EXAMPLE 3

| Content/Property | | 9 | 10 | 11 | 12 |
|---|---|---|---|---|---|
| Ethylene vinyl acetate (Evaflex 360) | | 75 | 75 | 75 | 75 |
| Linear low density polyethylene (LLDPE 118W) | | 20 | 20 | 20 | 20 |
| Ethylene propylene diene monomer (Vistalon 7001) | | 5 | 5 | 5 | 5 |
| Magnesium hydroxide (KISUMA 5B) | | 120 | 120 | 120 | 120 |
| Carbon black (Corax N550) | | 5 | 5 | 5 | 5 |
| Pentaerythritol tetrakis(3(3,5-di tert-buty-4-hydroxyphenyl)propionate (Irganox1010) | | 1 | 1 | 1 | 1 |
| Di cumyl peroxide (Perkadox BC-FF) | | 0 | 0.2 | 0.4 | 0.6 |
| Room temperature | Tensile strength (MPa) | 7 | 9 | 10 | 11 |
| | Elongation at break (%) | 500 | 520 | 510 | 510 |
| Thermal aging at 100° C. for 168 hrs | Retention of tensile strength (%) | Over 80% | | | |
| | Retention of elongation at break (%) | Over 80% | | | |
| LOI (%) | | 35 | 35 | 34 | 33 |
| UL 94 test | | V-2 | V-2 | V-2 | H-B |

Cable extrusions of above compositions are conducted following routine thermoplastic method without post cross-linking process. Non cross-linking agent composition (run number 9) and 0.2-0.4 parts peroxide per hundred resin by weight (run number 10 and 11) show the best process ability and excellent surface smoothness of finished cables. On the contrary, more than 0.6 parts peroxide per hundred resin by weight compositions (run number 12) lead to scorch reactions in extrusion and the surface of extruded cables was not smooth. Similar to previous results, partially cross-linked composition (run number 10 and 11) show improved tensile strength compared to normal thermoplastic compositions (run number 9) without any processing problems. In addition, partially cross-linked compositions show excellent thermal properties.

EXAMPLE 4

| Content/Property | | 13 | 14 | 15 | 16 |
|---|---|---|---|---|---|
| Ethylene vinyl acetate (Evaflex 360) | | 75 | 75 | 75 | 75 |
| Linear low density polyethylene (LLDPE 118W) | | 20 | 20 | 20 | 20 |
| Ethylene propylene diene monomer (NORDEL IP 3722P) | | 5 | 5 | 5 | 5 |
| Magnesium hydroxide (MAGNIFIN A Grades H10A) | | 120 | 120 | 120 | 120 |
| Zinc Borate (Firebrake ZB) | | 5 | 5 | 5 | 5 |
| Red Phosphorus (RP-692) | | 4 | 4 | 4 | 4 |
| Carbon black (Corax N550) | | 5 | 5 | 5 | 5 |
| Pentaerythritol tetrakis(3(3,5-di tert-buty-4-hydroxyphenyl)propionate (Irganox1010) | | 1 | 1 | 1 | 1 |
| Di cumyl peroxide (Perkadox BC-FF) | | 0 | 0.1 | 0.2 | 0.3 |
| Room temperature | Tensile strength (MPa) | 8 | 11 | 12 | 12 |
| | Elongation at break (%) | 100 | 160 | 170 | 170 |

-continued

| Content/Property | | 13 | 14 | 15 | 16 |
|---|---|---|---|---|---|
| Thermal aging at 100° C. for 168 hrs | Retention of tensile strength (%) | Over 80% | | | |
| | Retention of elongation at break (%) | Over 80% | | | |
| LOI (%) | | 35 | 35 | 35 | 35 |
| UL 94 test | | V-0 | V-0 | V-0 | V-0 |

NORDEL IP 3722P (Hydrocarbon Rubber, producer: DOW Chemicals/USA, ENB ethylidene norbornene (diene) weight: 0.5%) is used as the surface treatment polymer for achieving better extruding performance and Exolit RP 692 (red phosphorus masterbatch, producer: Clariant/France, phosphorus content: approx. 50% (w/w)), Firebrake ZB (zinc borate, producer: Borax/USA) are used as intumescent flame retardants. Processing of test specimen and cable extrusion are similar to previous methods.

Non cross-linking agent composition (run number 13) and 0.1-0.2 parts peroxide per hundred resin by weight (run number 14 and 15) compositions show the best process ability and excellent surface smoothness of finished cables. On the contrary, 0.3 parts peroxide per hundred resin by weight composition (run number 16) lead to scorch reactions in extrusion and the surface of extruded cables are not smooth. From the results, it is found that partially crosslinked compositions (run number 14 and 15) show much improved mechanical properties compared to normal thermoplastic composition (run number 13) without any processing problems. Specially, elongation at break increases from 100% to 160% by partial cross-linking. In addition, the above partially cross-linked compositions show excellent thermal properties by passing thermal aging test (100° C.×136 hours). All compositions show excellent flame retardancy with passing V-0 of UL 94 test, however, non partially crosslinked composition (run number 13) shows poor mechanical properties but excellent flame retardancy. On the contrary, partially crosslinked compositions (run number 14 and 15) show excellent mechanical properties with excellent flame retardancy.

EXAMPLE 5

| Content/Property | | 17 | 18 | 19 | 20 |
|---|---|---|---|---|---|
| Ethylene vinyl acetate (Evaflex 360) | | 75 | 75 | 75 | 75 |
| Linear low density polyethylene (LLDPE 118W) | | 20 | 20 | 20 | 20 |
| Ethylene propylene diene monomer (NORDEL IP 3722P) | | 5 | 5 | 5 | 5 |
| Magnesium hydroxide (KISUMA 5B) | | 120 | 120 | 120 | 120 |
| Zinc Borate (Firebrake ZB) | | 5 | 5 | 5 | 5 |
| Red Phosphorus (RP-692) | | 4 | 4 | 4 | 4 |
| Carbon black (Corax N550) | | 5 | 5 | 5 | 5 |
| Pentaerythritol tetrakis(3(3,5-di tert-buty-4-hydroxyphenyl)propionate (Irganox1010) | | 1 | 1 | 1 | 1 |
| Paraffin wax | | 1 | 1 | 1 | 1 |
| Di cumyl peroxide (Perkadox BC-FF) | | 0 | 0.2 | 0.4 | 0.6 |
| Room temperature | Tensile strength (MPa) | 6 | 9 | 10 | 10 |
| | Elongation at break (%) | 230 | 200 | 200 | 200 |
| Thermal aging at 100° C. for 168 hrs | Retention of tensile strength (%) | Over 80% | | | |
| | Retention of elongation at break (%) | Over 80% | | | |
| LOI (%) | | 35 | 35 | 35 | 35 |
| UL 94 test | | H-B | V-0 | V-0 | V-0 |

Paraffin wax is used as the surface treatment agent for achieving better extruding performance. Processing of test specimen and cable extrusion are same as previous methods.

Non cross-linking agent composition (run number 17) and 0.2-0.4 parts peroxide per hundred resin by weight (run number 18 and 19) compositions show the best process ability and excellent surface smoothness of finished cables. On the contrary, 0.6 parts peroxide per hundred resin by weight composition (run number 20) lead to scorch reactions in extrusion and the surface of extruded cables were not smooth. From the results, it is found that partially crosslinked compositions (run number 18 and 19) show much improved mechanical properties compared to normal thermoplastic composition (run number 17) without any processing problems. Specially, tensile strength increases from 6 MPa to 9 MPa by partial cross-linking. In addition, the above partially cross-linked compositions show excellent thermal properties by passing thermal aging test (100° C.×136 hours). All compositions show excellent flame retardancy with passing V-0 of UL 94 test, however, non partially crosslinked composition (run number 17) shows poor mechanical properties but excellent flame retardancy. On the contrary, partially crosslinked compositions (run number 18 and 19) show excellent mechanical properties with excellent flame retardancy.

EXAMPLE 6

| Content/Property | | 21 | 22 | 23 | 24 |
|---|---|---|---|---|---|
| Ethylene vinyl acetate (Evaflex 360) | | 75 | 75 | 75 | 75 |
| Linear low density polyethylene (LLDPE 118W) | | 20 | 20 | 20 | 20 |
| Ethylene propylene diene monomer (NORDEL IP 3722P) | | 5 | 5 | 5 | 5 |
| Magnesium hydroxide (MAGNIFIN A Grades H10A) | | 120 | 120 | 120 | 120 |
| Zinc Borate (Firebrake ZB) | | 5 | 5 | 5 | 5 |
| AOM(Ammonium Octamolybdate):CLIMAX | | 7 | 7 | 7 | 7 |
| Pentaerythritol tetrakis(3(3,5-di tert-buty-4-hydroxyphenyl)propionate (Irganox1010) | | 1 | 1 | 1 | 1 |
| Di cumyl peroxide (Perkadox BC-FF) | | 0 | 0.1 | 0.2 | 0.3 |
| Room temperature | Tensile strength (MPa) | 8 | 12 | 12 | 12 |
| | Elongation at break (%) | 100 | 200 | 200 | 200 |

-continued

| Content/Property | | 21 | 22 | 23 | 24 |
|---|---|---|---|---|---|
| Thermal aging at 100° C. for 168 hrs | Retention of tensile strength (%) | Over 80% | | | |
| | Retention of elongation at break (%) | Over 80% | | | |
| LOI (%) | | 34 | 34 | 34 | 33 |
| UL 94 test | | V-0 | V-0 | V-0 | V-0 |

CLIMAX (AOM (ammonium octamolybdate), producer: Climax Molybdenum Company/USA, formula: $(NH_4)_4Mo_8O_{26}$) is used as fire suppression agent for improving flame retardancy. Above compositions are suitable for white or color insulation materials (non black). Processing of test specimen and cable extrusion are similar to previous methods. In the case of non black color insulation materials, it is not easy to achieve appropriate mechanical properties with high flame retardancy because non black color insulation materials do not use carbon black or colored flame retardants such as red phosphorus. Therefore, partially cross-linking is very suitable method to obtain increased mechanical properties.

Non cross-linking agent composition (run number 21) and 0.1-0.2 parts peroxide per hundred resin by weight (run number 22 and 23) compositions show the best process ability and excellent surface smoothness of finished cables. On the contrary, 0.3 parts peroxide per hundred resin by weight composition (run number 24) leads to scorch reactions in extrusion and the surface of extruded cables was not smooth. From the results, it is found that partially crosslinked compositions (run number 22 and 23) show much improved mechanical properties compared to normal thermoplastic composition (run number 21) without any processing problem. Specially, tensile strength increases from 8 MPa to 12 MPa and elongation at break increases from 100% to 200% by partial cross-linking. In addition, the above partially cross-linked compositions show excellent thermal properties by passing thermal aging test (100° C.×136 hours). All compositions show excellent flame retardancy with passing V-0 of UL 94 test, however, non partially crosslinked composition (run number 21) shows poor mechanical properties but excellent flame retardancy. On the contrary, partially crosslinked compositions (run number 22 and 23) show excellent mechanical properties with excellent flame retardancy.

The reason for using LDPE (or LLDPE) in base polymers is to increase thermal properties of thermoplastic clean flame retardant compositions. In general, high filler mixable polymers, such as ethylene vinyl acetate(EVA), ethylene ethyl acrylate(EEA) or ethylene alpha olefin have very low softening temperatures. Mostly, their softening points are under 100° C. Therefore, it is apparent that using only low softening temperature grade polymers without any high temperature grade polymers in base polymers will lead to loss in thermal properties. The thermal aging test condition of thermoplastic clean flame retardant material is 100° C. for 136 hours. To achieve appropriate thermal stability, the mixing of high temperature grade polymer such as polyethylene is required. Therefore, the base polymers in thermoplastic clean flame retardant compositions should have appropriate thermal stability to pass the thermal aging test (at 100° C. for 136 hours). However, polyethylene has low filler mix ability and lower flame retardancy, accordingly, ethylene vinyl acetate/polyethylene compounded base polymers can mix less volume of flame retardants and decrease flame retardancy compared to 100% ethylene vinyl acetate base polymer.

Normal thermosetting type clean flame retardant compositions are presented in conventional EXAMPLE 4 to demonstrate the differences between our invention and normal thermosetting type. The main difference is the content of crosslinking agent. Namely, normal thermosetting clean flame retardant compositions contain 2-4 parts by weight of crosslinking agent while the compositions of this invention contain 0.1-0.4 parts by weight of crosslinking agent. Moreover, processing methods of both compositions are quite different from each other.

Mechanical properties (tensile strength and elongation at break) were measured using a universal testing machine Model 5543 from Instron, USA in accordance with ASTM D 638M with testing conditions: speed of 500 mm/minute at 25° C. LOI (Limiting Oxygen Index) is a simple method to evaluate the flame retardancy of the materials. LOI was performed using an apparatus of Fire Testing Technology limited (Incorporating Stanton Redcroft), UK in accordance with ISO 4589 and ASTM D 2863. LOI corresponds to the minimum percentage of oxygen needed for the combustion of specimens (80×10×1 mm) in an oxygen-nitrogen atmosphere. The other method to estimate the flame retardancy of the materials is UL 94. Flammability standard by Underwriters Laboratories, USA. UL 94 test was performed using a flammability chamber of CEAST Co., Italy, in accordance with ASTM D 635 for horizontal and ASTM D 3801 for vertical test positions. The standard classifies plastics according to how they burn in various orientations and thicknesses.

Although the present embodiments have been described with reference to specific example embodiments, it will be evident that various modifications and changes may be made to these embodiments without departing from the broader spirit and scope of the various embodiments. Accordingly, the specification and examples are to be regarded in an descriptive rather than a restrictive sense.

What is claimed is:

1. A thermoplastic extrudable composition comprising:
100 parts by weight of a base polymer;
100-150 parts by weight of an inorganic flame retardant;
2-20 parts by weight of an intumescent flame retardant;
0.5-1.5 parts by weight of an antioxidant;
5 parts by weight of a coloring agent; and
0.1-0.5 parts by weight of a cross linking agent for partial cross linking of the thermoplastic extrudable composition and to increase the mechanical property of the thermoplastic extrudable composition from 100% to 160% and a flame retardancy of the thermoplastic extrudable composition to a V0 level.

2. The composition according to claim 1 wherein the base polymer is under 50% below the total weight of the thermoplastic extrudable composition and the inorganic flame retardant and the intumescent flame retardant have a particle size that is under 50 μm.

3. The composition according to claim 1, wherein the base polymer is at least one of ethylene vinyl acetate (EVA), EVA-polyethylene, ethylene alpha olefin, ethylene alpha olefin-polyethylene, ethylene ethyl acrylate, ethylene ethyl acrylate-polyethylene, EVA- polyethylene-ethylene propylene diene monomer (EPDM), ethylene alpha olefin- polyethylene-EPDM and ethylene ethyl acrylate-polyethylene-EPDM.

4. The composition according to claim 3, wherein the base polymer is ethylene vinyl acetate (EVA).

5. The composition according to claim 1, further comprising a processing aid 1-10 parts by weight.

6. The composition according to claim 1, wherein the inorganic flame retardant is at least one of aluminum trihydroxide (ATH), magnesium hydroxide (MH) and huntite hydromagnesite (HH).

7. The composition according to claim 1, wherein the intumescent flame retardant is at least one of red phosphorus, zinc borate, a salt of a zinc acid and ammonium octamolybdate (AOM).

8. The composition according to claim 1, wherein the cross linking agent is dicumyl peroxide.

9. The composition according to claim 1 further comprising of a coloring agent 5 parts by weight, wherein the coloring agent is carbon black.

10. The composition of claim 1, wherein the inorganic flame retardant is a non halogen flame retardant.

11. A method of extruding a thermoplastic composition, comprising:

blending a thermoplastic extrudable composition comprising:

100 parts by weight of a base polymer;

100-150 parts by weight of an inorganic flame retardant;

2-20 parts by weight of an intumescent flame retardant;

0.5-1.5 parts by weight of an antioxidant 5 parts by weight of a coloring agent; and 0.1-0.5 parts by weight of a cross linking agent for partial cross linking of the thermoplastic extrudable composition and to increase the mechanical property of the thermoplastic extrudable composition from 100% to 160% and a flame retardancy of the thermoplastic extrudable composition to a V0 level.

12. The method according to claim 11 further comprising adding 20 parts by weight of a polyethylene to the base polymer to enhance thermal properties.

13. The method according to claim 11 further comprising adding 5 parts by weight of a coloring agent carbon black.

14. The method according to claim 11 further adding a paraffin wax as a surface treatment agent.

15. The method of claim 14 further comprising extruding the thermoplastic extrudable composition without post curing.

16. The method of claim 15 further comprising maintaining an extruding temperature between 140°-180° C.

17. A cable comprising:

a wire;

a sheath encompassing the wire, wherein the sheath is blended from a thermoplastic extrudable composition comprising the following components:

100 parts by weight of a base polymer;

20 parts by weight of a polyethylene;

100-150 parts by weight of an inorganic flame retardant;

2-20 parts by weight of an intumescent flame retardant;

0.5-1.5 parts by weight of an antioxidant;

0.1-0.5 parts by weight of a cross linking agent for partial cross linking of the thermoplastic extrudable composition and to increase the mechanical property of the thermoplastic extrudable composition from 100% to 160% and a flame retardancy of the thermoplastic extrudable composition to a V0 level;

5 parts by weight of a coloring agent which is carbon black; and 1-10 parts by weight of a surface treatment agent.

18. The cable according to claim 17, wherein the sheath is partially cross linked the thermoplastic extrudable composition, wherein the sheath is extruded the thermoplastic extrudable composition without post curing, and wherein the extruding temperature is maintained between 140°-180° C.

19. A-The cable according to claim 18, wherein the base polymer is less than 50% parts by weight, thermoplastic extrudable composition is extruded without post curing and the inorganic flame retardant and the intumescent flame retardant have a particle size that is under 50 μm.

20. A cable, comprising:

a wire;

a coating on the wire comprising:

100 parts by weight of a base polymer;

20 parts by weight of a polyethylene;

100-150 parts by weight of an inorganic flame retardant;

2-20 parts by weight of an intumescent flame retardant;

0.5-1.5 parts by weight of an antioxidant;

5 parts by weight of a coloring agent which is carbon black 0.1-0.5 parts by weight of a cross linking agent for partial cross linking the coating to increase the mechanical property from 100% to 160% and flame retardancy to V0 level; and 1-10 parts by weight of a surface treatment agent.

* * * * *